US005673990A

United States Patent [19]
Neumann et al.

[11] Patent Number: 5,673,990

[45] Date of Patent: Oct. 7, 1997

[54] HEADLIGHT

[75] Inventors: Rainer Neumann, Stuttgart; Heike Eichler, Reutlingen, both of Germany

[73] Assignee: Robert Bosch GmbH, Stuttgart, Germany

[21] Appl. No.: 586,069

[22] Filed: Jan. 16, 1996

[30] Foreign Application Priority Data

Jan. 17, 1995 [DE] Germany ........................ 195 01 173.2

[51] Int. Cl.[6] ........................ B60Q 1/04

[52] U.S. Cl. ........................ 362/61; 362/282; 362/351

[58] Field of Search ........................ 362/61, 280, 282, 362/284, 287, 297, 298, 351, 346

[56] References Cited

U.S. PATENT DOCUMENTS 3,124,309 3/1964 Cantoni et al. ........................ 362/282
4,922,390 5/1990 Nakazawa et al. ........................ 362/351

FOREIGN PATENT DOCUMENTS 0381851 8/1990 European Pat. Off. .
3415867 10/1985 Germany .
4002576 8/1991 Germany .
4137332 5/1992 Germany ........................ 362/351

*Primary Examiner*—Y My Quach
*Attorney, Agent, or Firm*—Michael J. Striker

[57] ABSTRACT

The headlight has a gas discharge lamp and a reflector. The reflector has an upper reflector region and a lower reflector region. A lens is arranged after the reflector in a light outlet direction, and a screen device is provided between the reflector and the lens. A movable screen member of the screen device is adjustable between a position for low beam in which it screens light reflected from the lower reflector region and produces a bright-dark limit, and a position for high beam in which light reflected from the lower reflector region passes past the screen member and can exit the headlight. Moreover, the movable screen member in its position for low beam is adjustable between a position for right traffic and a position for left traffic. Therefore the head light can be used in a simple manner as a high beam head light and a low beam head light, and also can be converted for the utilization for right traffic and left traffic.

10 Claims, 4 Drawing Sheets

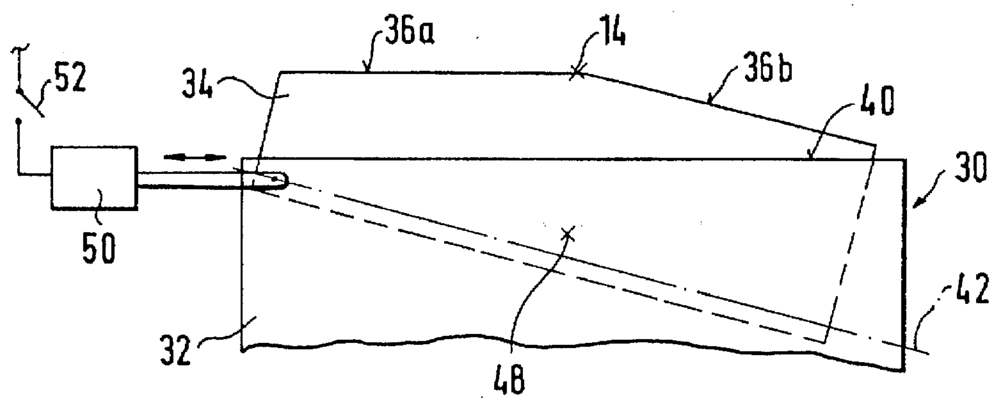
FIG.4
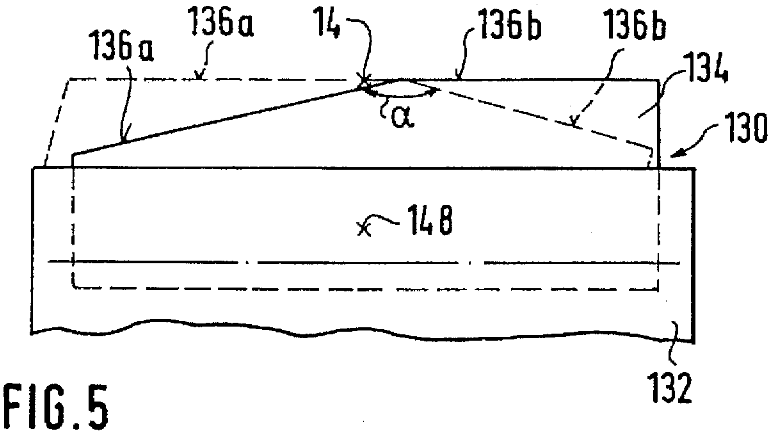
FIG.5
FIG.6
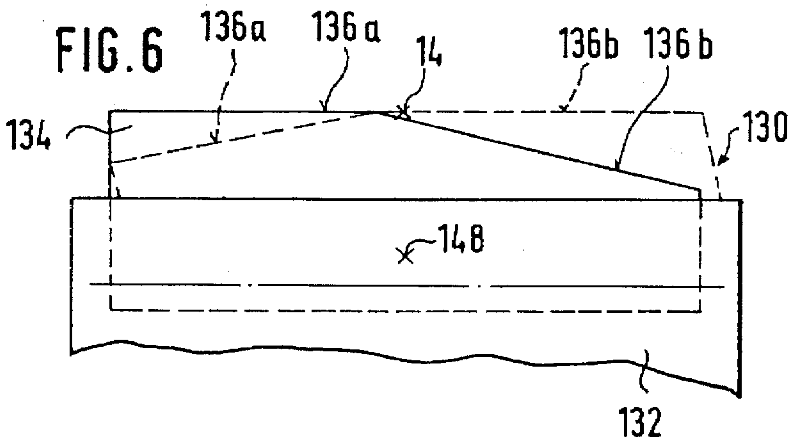

HEADLIGHT

BACKGROUND OF THE INVENTION

The present invention relates to a headlight for vehicles.

Headlights for vehicles are widely known in the art. One of such headlight is disclosed in the German document DE 40 02 576 A1. The headlight has a gas discharge lamp as a light source and a reflector with an upper reflector region and a lower reflector region. Light reflected from the upper reflector region as a converging light beam which forms a low beam light bundle. Light reflected from the upper and lower reflector regions form together a highlight bundle. A lens is arranged after the reflector as considered in a light outlet direction, through which the light reflected from the upper reflector region passes. A screen arrangement is arranged between the reflector and the lens. It has a single screen and an upper edge producing a bright-dark limit of the low beam light bundle. The screen also forms a screening device associated with the lower reflector region and switchable between a position for the low beam light and a position for high beam light. In the position for the low beam light the light reflected through the screen from the lower reflector region is screened and in the position of the high beam light the light reflected from the lower reflector region passes on the screen and exits the headlight. This known headlight can be used both for the low beam light and for the high beam light. However, for right traffic and left traffic, different constructions are needed, which increase the manufacturing expense of the headlight.

SUMMARY OF THE INVENTION

Accordingly, it is an object of the present invention to provide a headlight of the above mentioned general type, which avoids the disadvantages of the prior art.

In keeping with these objects and with others which will become apparent hereinafter, one feature of the present invention resides, briefly stated, in a headlight for vehicles in which an edge of a screen member has two edge portions which are located near one another in a horizontal direction, the bright-dark limit of the traffic side of the vehicle having the headlight is produced by one edge region while the bright-dark limit of the opposite traffic side is produced by the other edge portion, the both edge portions are offset relative to one another in a vertical direction, and the screen member is adjustable between a position for the right traffic and a position for the left traffic, and in both positions the edge portion which produces the bright-dark limit of the traffic side is deeper in a vertical direction than the edge portion which produces the bright-dark limit on the counter traffic light.

When the headlight is designed in accordance with the present invention, it can be used both for the right traffic and the left traffic so that only one headlight design can be used for both traffic types.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a view showing a screen device in a position for a low beam light and a left traffic;

FIG. 5 is a view showing the screen device in accordance with a second embodiment of the present invention with a construction optimized for the right traffic in a position for a low beam light;

FIG. 6 is a view showing a screen device in accordance with the second embodiment of the invention in an embodiment optimized for the left traffic;

DESCRIPTION OF THE PREFERRED EMBODIMENTS

Figure 1:
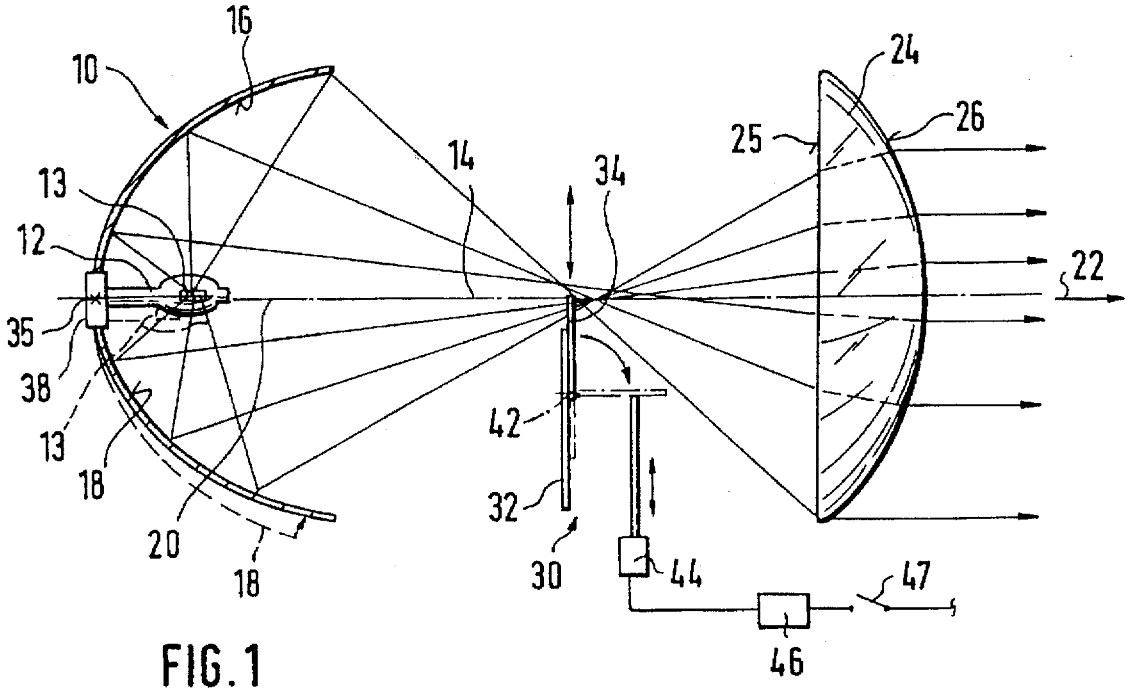
FIG. 1 is a view showing a headlight for a vehicle in a vertical longitudinal section.

A headlight for a vehicle, in particular a motor vehicle, shown in FIG. 1, serves for selective production of a low beam light and a high beam light. The headlight has a reflector 10 and a light source formed by a gas discharge lamp 12 inserted in the reflector. During the operation a light arc 13 is formed in the gas discharge lamp 12 and extends axially along the optical axis 14. The reflector 10 has an upper reflector region 16 and a lower reflector region 18. The transition between the reflector regions 16 and 18 can be arranged in a horizontal central plane 20 of the reflector 10 or offset upwardly or downwardly relative to this plane. The transition between both reflector regions 16 and 18 can be formed as a step or a band, or can be continuous, in other words without the step or the band. The upper reflector region 16 is formed so that the light produced by the gas discharge lamp 12 is reflected as a converging light beam.

A lens 24 is arranged after the reflector 10 as considered in a light outlet direction 22. The light reflected from the upper reflector region 16 passes through the lens 24. The lens 24 is formed as a collecting or collimating. It has a plan surface 25 facing the reflector 10 and a convexly curved surface 26 facing away from the reflector 10. The curved surface 26 of the lens 24 is preferably formed aspherical. Light reflected from the upper reflector region 16 is deviated by the lens 24, for example so that after passage through the lens 24 it extends in vertical longitudinal planes substantially parallel to the optical axis 14 or inclined relative to it downwardly in the light outlet direction 22 and dispersed in the horizontal longitudinal planes. In addition, a light permeable cover disc can be arranged after the lens 24 as considered in the light outlet direction 22. It can be formed as a smooth disc or can be provided with optically efficient elements for deviating the light passing through the disc.

Figure 2:
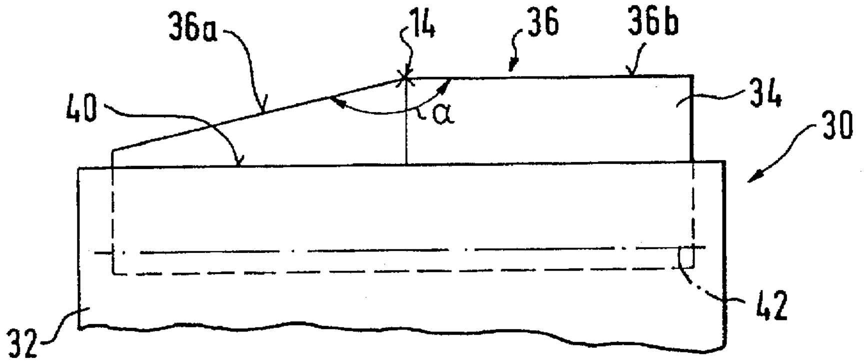
FIG. 2 is a view showing a headlight in a section taken along the line II—II in FIG. 1 with a screen device in accordance with a first embodiment of the invention, in a position for a low beam light and a right traffic.

A screen device 30 is arranged between the lens 24 and the reflector 10. It is composed of a stationarily arranged screen member 32 and a movable screen member 34. The stationary screen member 32 can be mounted for example on a front edge of the reflector 10 as considered in the light outlet direction 22. The screen device 30 is arranged substantially underneath the optical axis 14, as considered in the light outlet direction 24 after the lower reflector region 18. The movable screen member 34 has an upper edge 36. A bright-dark limit of the light bundle exiting the headlight is produced by the upper edge 36 in a first position of the screen member 34, in which position it extends outwardly beyond the stationary screen member 32 in a vertical direction as shown in FIG. 2. In this first position the movable screen member 34 is located in an operational position of the headlight for a low beam light. The light reflected from the lower reflector region 18 is screened in this first position by the movable screen member 34, so that it does not exit the headlight.

Figure 3:
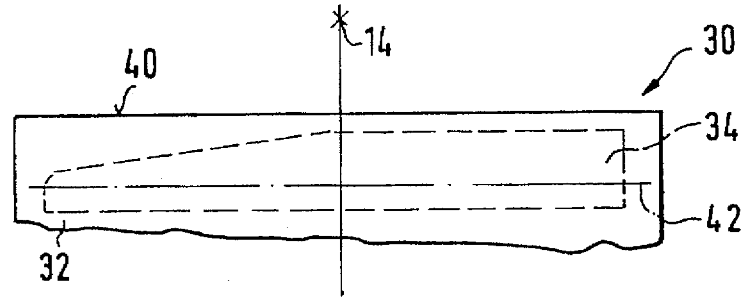
FIG. 3 is a view showing the screen device in a position for a high beam light.
Figure 9:
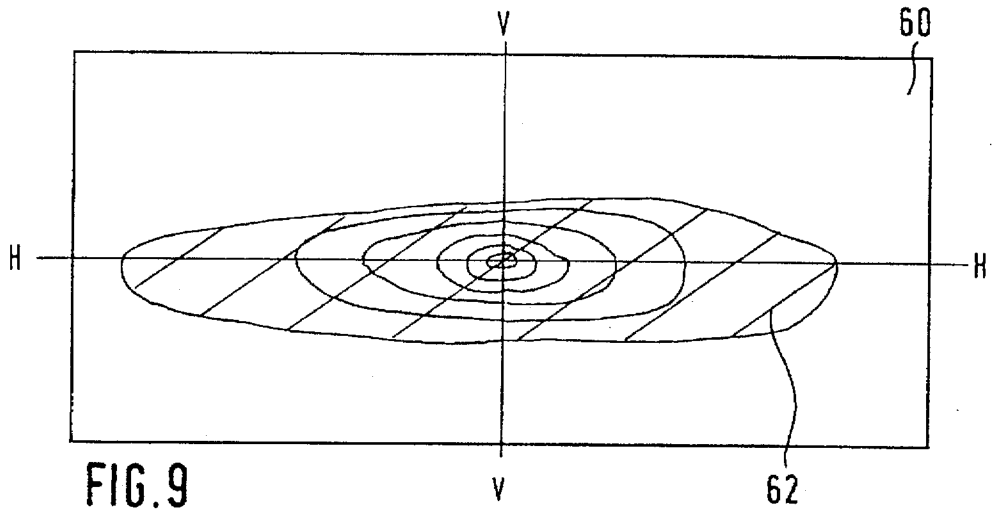
FIG. 9 is a view showing a measuring screen with a region illuminated by the light produced by the headlight in the operational position for low beam light.

The movable screen member 34 is movable to a second position in which it is arranged underneath the stationary screen member 32 as shown in FIG. 3. In this second position, the movable screen member 34 is located in operational position of the headlight for a high beam light. The light reflected from the lower reflector region 18 in the second position of the movable screen member 34 can be pass along over the movable screen member 34 and the stationary screen member 32 and exit the headlight. It illuminates a region which is identified with reference numeral 62 on a measuring screen 60 located in front of the headlight as shown in FIG. 9.

The high light bundle exiting the headlight in the operational position for high light is thereby formed by the light reflected by the upper reflector region 16 and the lower reflector region 18. While the low beam light bundle exiting the headlight in the operational position for low beam light is formed only by the light reflected by the upper reflector region 16. In the operational position for the high light, the light reflected from the lower reflector region 18 can pass through the lens 24 and thereby can be deviated. On the other hand, it can be provided that the light reflected from the lower reflector region 18 passes past the lens 24 and thereby is no longer deviated. The cover disc can be provided with optically effective elements by which the light reflected by the lower reflector region 18 can be deviated.

The upper reflector region 16 is optimized so that the light reflected by this region in cooperation with the lens 24 forms an efficient low beam light bundle, while the lower reflector region to the contrary is optimized so that the light reflected by this region together with the light reflected by the upper reflector region 16 forms an efficient high light beam. The transition between both reflector regions 16 and 18 can be continuous, or in other words, can be stepless. On the other hand, it also can have a step. The upper reflector region 16 can be formed so that in axial longitudinal sections which contain the optical axis 14 it includes ellipses or ellipse-like curves. The upper reflector region 16 therefore is not rotation-symmetrical, and contains different curves and different axial longitudinal sections. The lower reflector region 18 can be also formed so that in different axial longitudinal sections it contains different ellipses or ellipse-like curves, and the light emitted by the gas discharge lamp 12 is reflected as a converging light bundle.

The lower reflector region 18 has a front end as considered in the light outlet direction 22. The lower reflector region 18, as shown in FIG. 1, can be turned upwardly relative to the upper reflector region 16 from a position shown in a broken line around a horizontal axis 35 which extends perpendicular to the optical axis 14. The turning axis 35 can be arranged in the apex region 38 of the reflector 10.

In addition to the movement of the movable screen member 34 between its above described first and second positions during switching of the headlight between the operational position for the low beam light and the operational position for the high beam light, the gas discharge lamp 12 can be moved in direction of the optical axis 14 and/or in a vertical direction relative to the optical axis 14. Preferably, the gas discharge lamp 12 in the operational position for the high beam light is located in a first position in which its light arc 13, as shown in FIG. 1 with solid line, is arranged substantially on the optical axis 14, and spaced by a predetermined distance from the apex 38 of the reflector 10. In the operational position of the headlight for the low beam light, the gas discharge lamp 12 is located in a second position in which its light arc 13, as shown in FIG. 1 with broken lines, is offset downwardly relative to the optical axis 14 and is arranged at a smaller distance from the reflector apex 38 than in its first position. It is thereby provided that in the operational position of the headlight for the low beam light a high illumination intensity is available closely underneath the bright-dark limit, and in the operational position for the high beam light the region in front of the vehicle which is illuminated with the higher light intensity is arranged at a greater distance from the vehicle. In other words, the high beam region in front of the vehicle is illuminated stronger than in the operational position for the low beam light.

The stationary screen member 32 -can also have an upper-edge 40 which is operative when the movable screen member 34 is located in the operational position of the headlight for the high beam light in its second position shown in FIG. 3. The upper edge 40 of the stationary screen member 32 is arranged preferably horizontally. Only a low part of the light reflected from the lower reflector region 18 is screened by the upper edge 40, and therefore it contributes only a little to the headlight bundle.

The movable screen member 34 can be movable relative to the stationary screen member 32 in a vertical direction rectilinearly. Alternatively, it can be provided that the movable screen member 34 is turnable about a substantially horizontal axis 42 extending substantially perpendicular to the optical axis 14. The movable screen member 34 can be guided on the stationary screen member 32, or supported through the axis 42 on the stationary screen member 32. For moving of the screen member 34, an adjusting element 44 is provided. It can be operated by an electric motor, hydraulically or pneumatically and actuated by a control device 46. The control device 46 can be connected with a light switch 47 of the vehicle. A vehicle driver switches the light switch 47 between the low beam light and the high beam light and actuates the adjusting element 44 correspondingly.

FIGS. 2–4 show the screen device 30 in accordance with the first embodiment. In this embodiment the upper edge 36 of the movable screen member 34 has two edge portions **36*a* and 36*b* arranged near one another. Both edge portions 36*a*, 36*b* are inclined relative to one another and enclose an angle $\alpha$ of substantially 165° on the screen member 34. Both edge portions 36*a*, 36*b* abut against one another substantially in the region of the optical axis 14. In FIG. 2 the movable screen member 34 is arranged so that the right edge portion 36*b* as considered in the light outlet direction 22 is arranged substantially horizontally, while the left edge portion 36*a* is inclined downwardly to the outer edge of the screen member 34. The edge portions 36***a* and 36*b* are projected both vertically and sidewise by the light reflected from the upper reflector region 16 as a converging light bundle.

Figure 10:
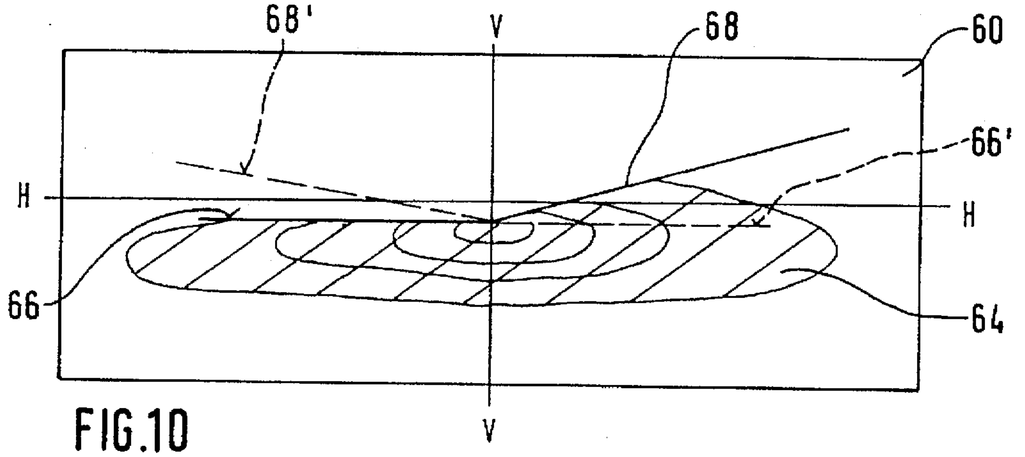
FIG. 10 is a view showing the measuring screen with the region illuminated by the screen device in accordance with the first embodiment in the operational position for low beam light.

FIG. 10 shows a measuring screen 60 arranged in front of the headlight and illuminated with region identified with reference numeral 64 by the low beam light emitted by the headlight. The right edge portion 36*b* of the screen member 34 produced a horizontal bright-dark limit 66 in front of the vehicle on the left traffic side, while the left edge portion 36*a* produces a bright-dark limit 68 which raises to the right on the right traffic side. Thereby the light bundle exiting the headlight corresponds to prescribed provisions in Europe, or so-called ECE Regulations, for an asymmetrical low beam light. In this position in accordance with FIG. 2 the movable screen member 34 is located when the vehicle is in a country with a right traffic. The movable screen member 34, in addition to its movement for switching of the headlight between the operational position for the low beam light and for the high beam light, is additionally turnable to a second position shown in FIG. 4 about an axis 48 extending substantially parallel to the optical axis 14. The axis 48 preferably at least approximately coincides with the optical axis 14. In this second position of the movable screen member 34, the left edge portion 36*a* is arranged substantially horizontally and the right edge portion 36 extends so that it is inclined downwardly to the right edge. Correspondingly, the horizontal bright-dark limit 66' shown in broken lines in FIG. 10 is produced by the horizontal edge portion 36*a* on the right traffic side, and an upwardly inclined bright-dark limit 68' is produced by the inclined edge portion 36*b* on the left traffic side. In this second, turned position, the movable screen member 34 is located when the vehicle is operated in a country with the left traffic. In both positions of the movable screen members 34, it has the edge portions 36*a*, 36*b* which are arranged near one another and all set in a vertical position relative to one another.

The turning of the movable screen member 34 about the axis 48 is performed by a further adjusting element 50 which engages the screen member 34 eccentrically to the axis 48. The adjusting element 50, similarly to the adjusting element 44, can be actuated by an electric motor hydraulically or pneumatically for movement of the screen member 34 between its low beam light position and high beam light position. It is operable by a vehicle driver through a switch element 52.

A screen device 130 in accordance with a second embodiment is shown in FIGS. 5 and 6. Here the stationary screen member 132 is not changed with respect to the first embodiment, and the movable screen member 134, as in the first embodiment, is movable for switching between the low beam light and the high beam light. The movable screen member 134 has the upper edge 136 with two edge portions 136*a* and 136*b* arranged near one another. The edge portions 136*a* and 136*b* form an angle $\alpha$ of substantially 165° on the screen member 134. They abut against one another not in the region of the optical axis 14, but instead offset in a horizontal direction to the optical axis. When the vehicle provided with the above described headlight is used predominantly in contrast with the right traffic, then in the position of the screen member 134 for the right traffic shown in the solid lines in FIG. 5, the inclined left edge portion 136*a* extends to the right outwardly over the optical axis 14, while the right, horizontally arranged edge portion 136*b* is formed only right of the optical axis 14. Thereby the light reflected from the upper reflector region 16 is better utilized when with the symmetrical arrangement of the screen member 34 in accordance with the first embodiment, and the low beam light bundle emitted by the headlight has a greater width at the side of the traffic, or in other words, at the right traffic side. In the position in which the screen member 134 is turned about the axis 148 for the right traffic, as shown in FIG. 5 with broken lines, the left edge 136*a* is arranged horizontally and extends to the right over the optical axis 14 outwardly, while the right edge portion 136 is inclined, and correspondingly does not extend to the optical axis 14.

The screen device 130 shown in FIG. 6 is provided for a vehicle which is used mainly in contrast with the left traffic. The movable screen member 134 is formed so that in the position of the screen member 134 for the left traffic, its right edge portion 136*b*, as shown in FIG. 6 with solid line, is inclined and extends to the left-over the optical axis 14 outwardly, while the edge portion 136*a* located only at the left of the optical axis 14 is arranged horizontally. When the screen member 134 is formed in this way, a good utilization of the light reflected by the upper reflector region 16 and a great width of the low beam light exiting the headlight is provided at the traffic side or in other words at the right traffic side. In the position of the screen member 134 for the right traffic shown in solid line in FIG. 6 in which it is turned about the axis 148, the right edge portion 136*b* is arranged horizontally and extends to the left over the optical axis 14 outwardly, while the left edge portion 136*a* is inclined. For the screen 130 of FIG. 6, the movable screen member 134 can be used in accordance with the embodiment of FIG. 5. It can be reversed, or in other words, so that its side facing the reflector 10 in FIG. 5 faces away from the reflector 10 in FIG. 6.

Figure 7:
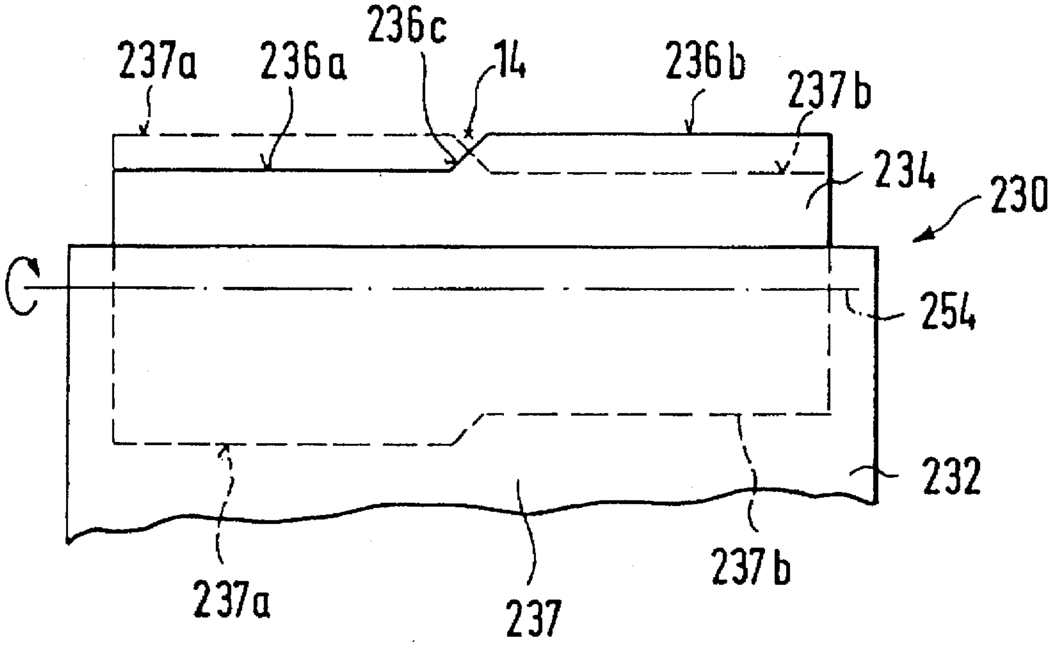
FIG. 7 is a view showing the screen device in accordance with a third embodiment of the present invention in a position for the low beam light.
Figure 11:
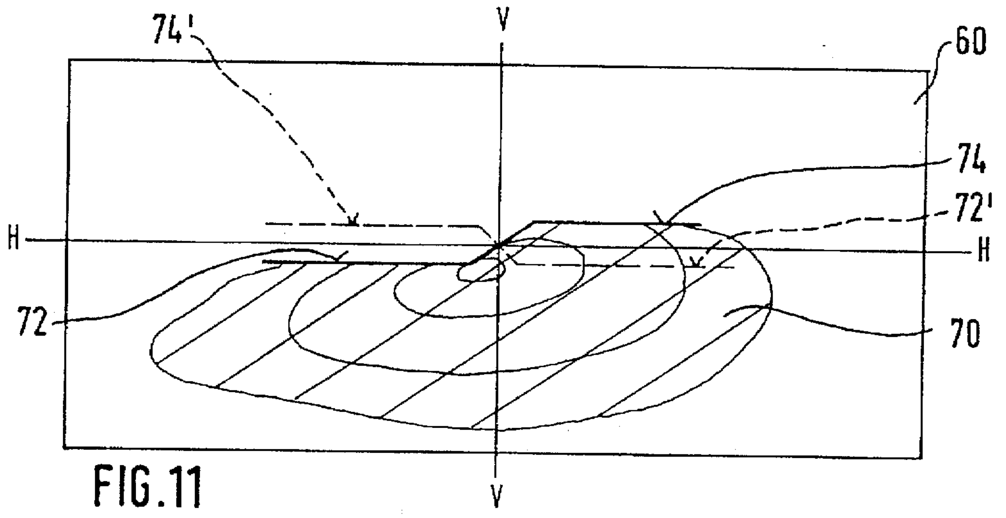
FIG. 11 is a view showing the measuring screen with the region illuminated with the screen device in accordance with the third embodiment in the operational position for the low beam light.

FIG. 7 shows the screen device 230 in accordance with a third embodiment. The movable screen member 234 has the upper edge 236 extending over the stationary screen member 232. The upper edge 236 has two edge portions 236*a* and 236*b* which are arranged near one another, extend substantially horizontally and are offset relative to one another in a vertical direction. A transition between the edge portions 236*a* and 236*b* in the region of the optical axis 14 is formed by an inclined portion 236*c*. The screen member 234 also has an edge 237 on its lower edge. The edge 237 extends to two edge portions 237*a* and 237*b* which are arranged near one another and are offset in a vertical direction in the same direction as the edge portions 236*a* and 236*b* of the upper edge 236. The screen member 234 shown in FIG. 7 in solid lines is located in its position for the right traffic, in which the left edge portion 236*a* is arranged deeper than the right edge portion 236*b*. Correspondingly, the left edge portion 237*a* of the lower edge 237 is arranged deeper than the right edge portion 237*b*. The measuring screen 60 illuminated by the low beam light bundle emitted by the headlight is shown in FIG. 11. The measuring screen 60 is illuminated in a region identified with reference numeral 70. It has a horizontal bright-dark limit 72 on the counter traffic side, or in other words at the left traffic side, which is produced by the right edge portion 236*b*. It also has a horizontal bright-dark limit 74 at the traffic side or in other words at the right traffic side, produced by the left edge portion 236*a*, which however is arranged higher than the bright-dark limit 72 at the counter traffic side. Therefore the headlight provided with the screen device 230 in accordance with the third embodiment satisfies the prescriptions for the low beam light in the United States and Japan.

For switching the left traffic, the screen member 234 is turnable about a substantially horizontally extending axis 254 which is substantially perpendicular to the optical axis 14. The axis 254 extends in the vertical direction through the center of the screen member 234. In FIG. 7 the screen member 234 is shown in its position for the left traffic with broken lines, in which it is turned around the axis 254. In this position the edge 237 extends over the stationary screen member 232 out and produces the bright-dark limit of the low beam. The left edge portion **237*a* is arranged in the vertical direction higher than the right edge portion 237*b*. Correspondingly, the measuring screen 60 is illuminated by the low beam exiting the headlight in the region 70. At the counter traffic side, or in other words, at the right traffic side, it has a horizontal bright-dark limit 72' shown in broken lines and produced at the left edge portion 237*a* and at the traffic side, or in other words at the left traffic side, it has a bright-dark limit 74' which also extend horizontally but is arranged higher and produced by the right edge portion 237*b*. The movable screen member 234** in accordance with the third embodiment is also movable for switching between the low beam light and the high beam light as in the first embodiment.

Figure 8:
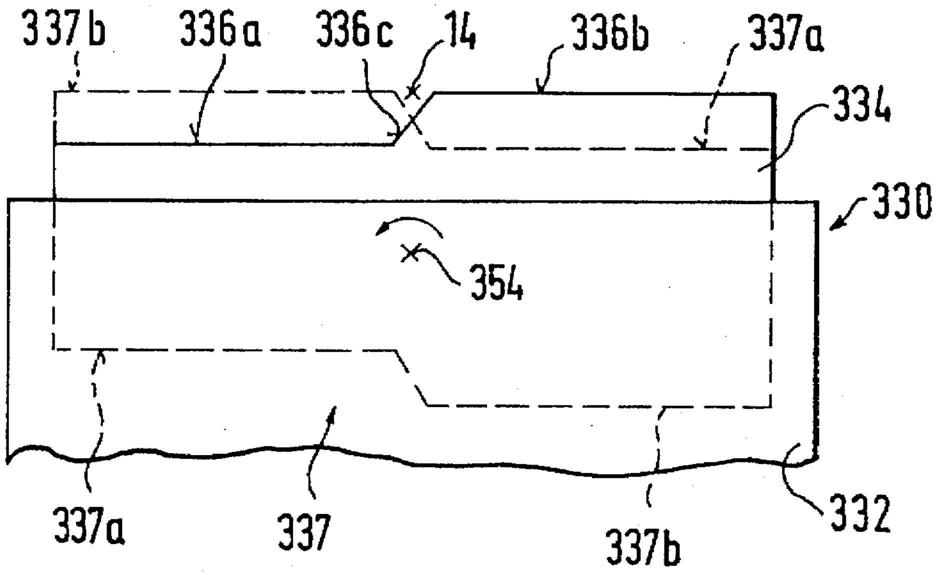
FIG. 8 is a view showing a screen device in accordance with the fourth embodiment of the present invention in a position for the low beam light.

The screen device 330 in accordance with a fourth embodiment is shown in FIG. 8. It has the stationary screen member 332 and the movable screen member 334. The upper edge 336 of the screen member 334 is formed as in the third embodiment, and has horizontally extending edge portions **336*a* and 336*b* which are offset relative to one another in the vertical direction. At its lower edge, the screen member 334 has an edge 337 including horizontally extending edge portions 337*a* and 337*b* which are arranged near one another. The edge portions 337*a*, 337*b* of the lower edge 337 are mirror-symmetrical to the edge portions 336*a*, 336*b* of the upper edge 336, while the left edge portion 337*a* is arranged higher than the right edge portion 337*b*. In FIG. 8 the screen member 334 is shown in solid lines in its position for the right traffic, in which the upper edge 336 produces the bright-dark limit. In its position for the left traffic shown in broken lines, the screen member 334 is turned about a horizontally extending axis 354 which extends substantially parallel to the optical axis 14. In this position the bright-dark limit is produced by the edge 337 which extends over the stationary screen member 332. The higher edge portion 337*b* is arranged at the left and the deeper edge portion 337*a*** is arranged at the right.

It will be understood that each of the elements described above, or two or more together, may also find a useful application in other types of constructions differing from the types described above.

While the invention has been illustrated and described as embodied in a headlight, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for vehicles, comprising a light source formed as a gas discharge lamp; a reflector having an upper reflector region and a lower reflector region formed so that light produced by said gas discharge lamp is reflected from said upper reflector region as a converging light beam and forms a low beam while light reflected from said upper reflector region and said lower reflector region together form a high beam; a lens arranged after said reflector as considered in a light outlet direction so that at least the light reflected from said upper reflector region passes through said lens; a screen device arranged between said reflector and said lens, said screen device having at least one screen member which is adjustable between a position for low beam in which said one screen member screens the light reflected from said lower reflector region and a position for high beam in which the light reflected from said lower reflector region passes past said one screen member and can exit the headlight, said at least one screen member having an edge formed so that in said position for low beam said edge produces a bright-dark limit of the low beam, said edge of said one screen member having two edge portions which are arranged near one another in a horizontal direction and formed so that one of said edge portions produces a bright-dark limit at a traffic side and another of said edge portions produces a bright-dark limit at a counter traffic side, said edge portions being offset relative to one another in a vertical direction, said one screen member being adjustable between a position for right traffic and a position for left traffic, so that in both said positions for right traffic and left traffic said one of said edge portions which produces the bright-dark limit at the traffic side is arranged deeper in vertical direction than another of said edge portions which produces the bright-dark limit at the counter traffic side.

2. A headlight as defined in claim 1, wherein said edge portions of said one screen member are inclined relative to one another, said other edge portion which produces the bright-dark limit at the counter traffic side being arranged horizontally and said one edge portion which produces the bright-dark limit at the traffic side being downwardly inclined relative to a horizontal in both said positions of said one screen member for right traffic and for left traffic.

3. A headlight as defined in claim 2, wherein said edge portions form an angle of substantially 165° on said one screen member.

4. A headlight as defined in claim 1, wherein said reflector has an optical axis, said one screen member being turnable about an axis extending substantially parallel to said optical axis of said reflector.

5. A headlight as defined in claim 1, wherein said reflector has an optical axis, said edge portions of said one screen member being arranged substantially horizontally, said one screen member having a lower edge which has two edge portions arranged near one another in a horizontal direction, said edge portions of said lower edge being offset relative to one another vertically in a same direction as said edge portions on an upper edge of said one screen member, said one screen member being turnable about a substantially horizontal axis extending substantially perpendicular to said optical axis and centrally through said one screen member, so that either one of said upper edge and said lower edge produce the bright-dark limit of the low beam.

6. A headlight as defined in claim 1, wherein said reflector has an optical axis, said edge portions of said one screen member being arranged substantially horizontally, said one screen member having a lower edge which has two edge portions arranged near one another in a horizontal direction, said edge portions of said lower edge being mirror-symmetrical relative to said edge portions on an upper edge of said one screen member, said one screen member being turnable about a substantially horizontal axis extending substantially parallel to said optical axis of reflector and centrally of said one screen member, so that either one of said upper edge and said lower edge produces the bright-dark limit of the low beam.

7. A headlight as defined in claim 1, wherein said lower reflector region is formed so that the light produced by said gas discharge lamp is reflected from said lower reflector region as a converging light beam which, in a position of said one screen member for high beam, the light also passes through said lens.

8. A headlight as defined in claim 1, wherein said reflector has an optical axis, said gas discharge lamp being formed so that during switching between low beam and high beam said gas discharge lamp is movable both along said optical axis of said reflector and also in a vertical direction relative to said optical axis.

9. A headlight as defined in claim 1, wherein said reflector has a transition between said upper reflector region and said lower reflector region, said transition extending in a horizontal central plane of said reflector.

10. A headlight as defined in claim 1, wherein said reflector has a transition between said upper reflector region and said lower reflector region, said transition being continuous.

* * * * *